(No Model.)
A. LE MOULT.
FLORIST'S FRAME AND STAND.
No. 284,745. Patented Sept. 11, 1883.
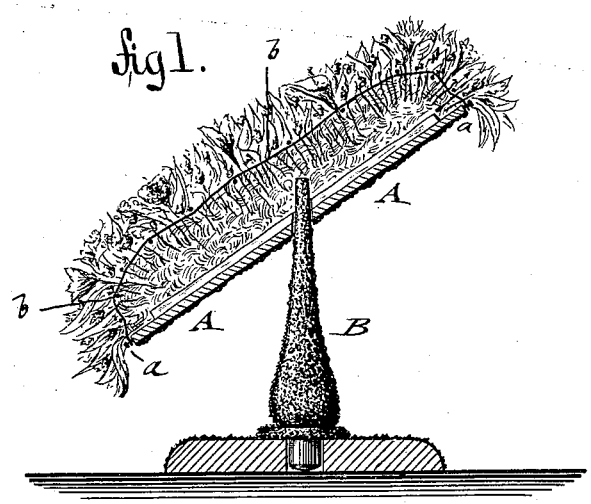
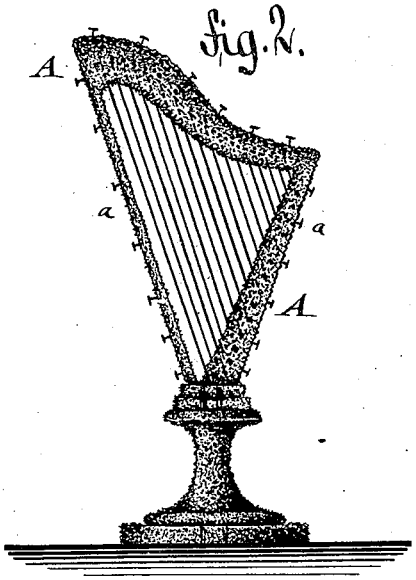
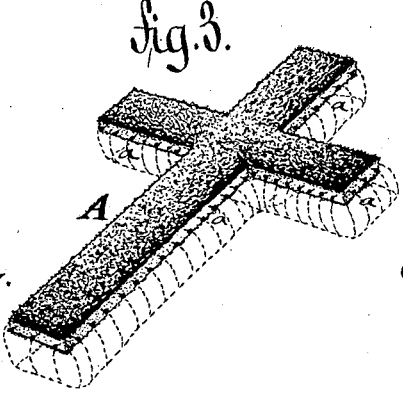
WITNESSES:
Jos. M. Rosenbaum.
Otto Risch.
INVENTOR
Adolphe Le Moult
BY Paul Goepel
ATTORNEY

UNITED STATES PATENT OFFICE.

ADOLPHE LE MOULT, OF NEW YORK, N. Y.

FLORIST'S FRAME AND STAND.

SPECIFICATION forming part of Letters Patent No. 284,745, dated September 11, 1883.

Application filed March 31, 1883. (No model.)

*To all whom it may concern:*

Be it known that I, ADOLPHE LE MOULT, of the city, county, and State of New York, have invented certain new and useful Improvements in Florists' Frames and Stands, of which the following is a specification.

Heretofore florists have used for floral decorations wire frames which were filled with moss, into which the flowers and leaves were inserted, the moss being covered at the back of the frames by tin-foil. The tin-foil backing of the frame was unsightly and objectionable, and consequently efforts have been made to dispense with the same, but without success. The wire frames, also, were objectionable, as they were bulky and required large boxes for shipping them.

The object of this invention is to furnish an improved frame for floral decorations, which is not only readily shipped, but more ornamental and in keeping with the character of the moss filling; and the invention consists of a wooden frame, corresponding in shape to the floral decoration, which frame is covered at the back with a layer of imitation of moss-bark, and provided at the edges with nails for applying the retaining-strings for the moss filling.

The invention consists, secondly, of a main frame or back for the floral piece, a detachable pillar or stand, and a detachable base, all of which are covered like the back of the main frame, in imitation of moss-bark.

In the accompanying drawings, Figure 1 represents a vertical transverse section of a florist's frame representing a pillow. Fig. 2 is a rear view of a frame for a harp, and Fig. 3 is a perspective rear view of a frame for a cross.

Similar letters of reference indicate corresponding parts.

In the drawings, A represents the frame or main piece, which is made according to the shape or size of the different floral decorations to be produced—such as pillars, vases, anchors, harps, and the like. The frame A is constructed of wood, and provided at the exterior edges with nails *a a*, or other equivalent devices, to which the intercrossing strings *b b*, that retain the moss filling on the main piece A, are fastened. Into the moss filling, which is thus retained by the strings *b b*, the flowers, leaves, and other ornamental devices are inserted in the customary manner.

The back of the main frame A is covered with a layer or coating, *d*, in imitation of moss-bark, or, if desired, with a covering of velvet, satin, or other suitable fabric, which can be used, as it is not in direct contact with the moist moss, but separated from the same by the wooden frame.

The main frame A is supported on a pillar, B, that is covered in like manner as the main frame. The upper end of the pillar B is inserted into a mortise of the main piece A, and connected in like manner to the base C, as shown in Fig. 1, the base being covered in the same manner as the main piece and pillar.

The different floral pieces present, by the ornamental frame and stand by which they are supported, a more ornamental appearance at the back, while the stand can be readily packed by separating the parts of which it is composed, so that a larger number of frames can be shipped in one box and at less expense.

Having thus described my invention, I claim as new and desire to secure by Letters Patent—

1. A frame for floral decorations, composed of a wooden main frame of suitable shape, coated or covered at the back and provided at the edges with means for applying the retaining-strings for the moss filling, substantially as set forth.

2. A frame for floral decorations, consisting of a main piece of suitable shape, provided at its edges with nails or other devices for applying the retaining-strings for the moss filling, of a supporting-pillar, and of a base, the back of the main piece as well as the surface of the pillar and base being covered in a suitable ornamental manner, substantially as set forth.

3. The combination, in a florist's frame, of a main piece, made of wood and provided at the edges with nails or other devices for applying the retaining-strings for the moss filling, with a detachable pillar and a detachable base, substantially as and for the purpose specified.

In testimony that I claim the foregoing as my invention I have signed my name in presence of two subscribing witnesses.

ADOLPHE LE MOULT.

Witnesses:
PAUL GOEPEL,
SIDNEY MANN.